(12) United States Patent  (10) Patent No.: US 9,342,240 B2
Sohn et al.  (45) Date of Patent: May 17, 2016

(54) KEYPAD DISPLAYING METHOD AND APPARATUS

(71) Applicant: Samsung Electronics Co. Ltd., Suwon-si, Gyeonggi-do (KR)

(72) Inventors: Chang-Ho Sohn, Yongin-si (KR); Hyeong-Su Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 265 days.

(21) Appl. No.: 13/938,744

(22) Filed: Jul. 10, 2013

(65) Prior Publication Data

US 2014/0019903 A1   Jan. 16, 2014

(30) Foreign Application Priority Data

Jul. 10, 2012  (KR) ........................ 10-2012-0075037

(51) Int. Cl.
*G06F 3/048*  (2013.01)
*G06F 3/0488*  (2013.01)
*G06F 3/0485*  (2013.01)

(52) U.S. Cl.
CPC .......... *G06F 3/04886* (2013.01); *G06F 3/0485* (2013.01)

(58) Field of Classification Search
CPC . G06F 3/04886; G06F 3/0485; G06F 3/0488; G06F 3/0236; G06F 3/0238; G06F 3/0481; G06F 3/04883
USPC ........................................ 715/773; 345/168
See application file for complete search history.

(56) References Cited

U.S. PATENT DOCUMENTS

| 8,869,059 | B2* | 10/2014 | Aono et al. | 715/773 |
| 2002/0027549 | A1* | 3/2002 | Hirshberg | 345/168 |
| 2006/0007178 | A1* | 1/2006 | Davis | 345/173 |
| 2008/0284744 | A1* | 11/2008 | Park et al. | 345/173 |
| 2008/0318635 | A1* | 12/2008 | Yoon et al. | 455/566 |
| 2010/0073302 | A1* | 3/2010 | Ritzau et al. | 345/173 |
| 2010/0259484 | A1* | 10/2010 | Jo | G06F 3/018 345/171 |
| 2011/0069012 | A1* | 3/2011 | Martensson | 345/173 |

* cited by examiner

*Primary Examiner* — Kieu Vu
*Assistant Examiner* — Asteway T Gattew
(74) *Attorney, Agent, or Firm* — Jefferson IP Law, LLP

(57) ABSTRACT

A keypad displaying method is provided. The keypad displaying method includes displaying a plurality of keys in a predetermined first display area, and upon receiving a signal corresponding to a request to cyclically shift the plurality of keys, cyclically shifting the plurality of keys in response to the request. The proposed keypad displaying method enables a user to conveniently enter text into a media device while holding the media device with one hand.

17 Claims, 4 Drawing Sheets

KEYPAD DISPLAYING METHOD AND APPARATUS

PRIORITY

This application claims the benefit under 35 U.S.C. §119 (a) of a Korean patent application filed on Jul. 10, 2012 in the Korean Intellectual Property Office and assigned Serial No. 10-2012-0075037, the entire disclosure of which is hereby incorporated by reference.

BACKGROUND OF THE INVENTION

1. Field of the Invention

The present invention relates to a keypad. More particularly, the present invention relates to a method and apparatus for displaying a keypad in a media device and a recording medium storing program sources for the method.

2. Description of the Related Art

In recent years, with the progress of information and communication technologies, there has been a dramatic increase in use of various media devices such as smart phones. These media devices according to the related art may be configured with a touch screen for the purpose of manipulation convenience and design simplicity.

The media devices are equipped with a variety of functions due to the prevalence of applications, which takes place by virtue of the universality of software platforms. For example, the media device according to the related art may include applications for Internet search, for note writing, for text messaging, and the like.

FIG. 1 schematically illustrates possible problems which may occur during text entry according to the related art.

Referring to FIG. 1, a user of a smart phone may enter text into the phone with the thumb while holding the phone in one hand. However, an ordinary user (e.g., a right-handed user) may have difficulty in touching and selecting the keys which are located in the left of the screen (e.g., which are placed in the left area of a reference line 110), while holding the smart phone with the right hand. If the ordinary user (e.g., the right-handed user) tries to touch and select the leftward keys of the reference line 110 by force while holding the smart phone with the right hand, typographic errors may frequently happen.

Therefore, a need exists for an apparatus and method for allowing a user to conveniently enter text into a media device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a way of allowing a user to conveniently enter text into a media device.

Other aspects of exemplary embodiments of the present invention will be apparent and understood throughout the following exemplary embodiments.

In accordance with an aspect of the present invention, a keypad displaying method is provided. The method includes displaying a keypad including a plurality of keys in a predetermined first display area, and upon receiving a signal corresponding to a request to cyclically shift the plurality of keys, cyclically shifting the plurality of keys in response to the request.

In accordance with an aspect of the present invention, a keypad displaying apparatus is provided. The apparatus includes a touch screen, and a controller for displaying a keypad including a plurality of keys in a predetermined first display area of the touch screen, and upon receiving a signal corresponding to a request to cyclically shift the plurality of keys, cyclically shifting the plurality of keys in response to the request.

In accordance with an aspect of the present invention, a non-transitory processor-readable recording medium is provided. The recording medium includes store a program including the steps of, displaying a keypad including a plurality of keys in a predetermined first display area, and upon receiving a signal corresponding to a request to cyclically shift the plurality of keys, cyclically shifting the plurality of keys in response to the request.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numerals are used to depict the same or similar elements, features and structures.

DETAILED DESCRIPTION OF EXEMPLARY EMBODIMENTS

Figure 1:
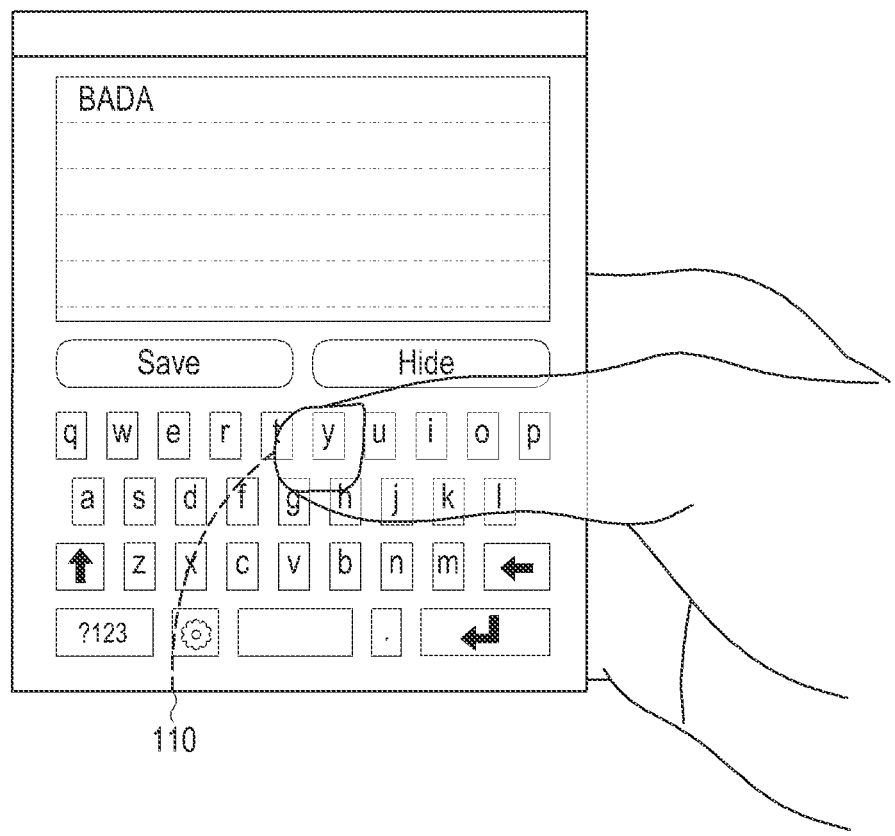
FIG. 1 schematically illustrates possible problems which may occur during text entry according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As described above, when a user enters text into a media device such as a smart phone while holding the media device with one hand, the user may have difficulty in touching and selecting the keys that are disposed in a location on the device for which it is difficult for the user to reach using the user's thumb.

To address these and other problems and disadvantages associated with media devices according to the related art, exemplary embodiments of the present invention provide a method or means for cyclically shifting keys of a keypad being displayed, thereby allowing the user to easily touch and select the keys. For example, cyclically shifting the keys of the keypad enable the user to more easily touch and select keys which would otherwise be disposed on an opposite side of the keypad for media devices according to the related art.

In the following description of exemplary embodiments of the present invention, a media device will be assumed to have a touch screen which can detect and recognize a user's gestures.

The term 'media device' as used herein may refer to a device capable of writing and displaying text, and the media device may include, for example, a portable phone, a smart phone, a tablet computer, a navigation terminal, a Personal Digital Assistant (PDA), a Portable Multimedia Player (PMP), a Moving Picture Experts Group layer 3 (MP3) player, a netbook computer, a desktop computer, a notebook computer, an Internet-accessible communication terminal, a broadcast-enabled communication terminal, a Global Positioning System (GPS) device, and the like.

Reference will now be made to the accompanying drawings to describe exemplary embodiments of the present invention.

FIGS. 2A to 2D schematically illustrate a keypad displaying method according to an exemplary embodiment of the present invention.

Referring to FIGS. 2A to 2D, when executing programs for searching the Internet, writing a note, or transferring a text message, a media device according to an exemplary embodiment of the present invention displays a keypad for text entry in a predetermined first display area 210. Upon a request for cyclic key shift from a user during text entry by the user, the media device cyclically shifts the keys being displayed, in response to the request.

The term 'cyclic key shift' as used herein may refer to an operation in which keys located on a leftmost side of the display area and keys located in the rightmost side of the display area are connected to each other and cyclically shifted so as to form a ring.

A user's request for the cyclic key shift is generated by, for example, a user's swiping gesture being input in the predetermined display area. For example, upon recognizing a user's gesture swiping leftward in the predetermined display area, the media device cyclically shifts the keys leftward. Similarly, upon recognizing a user's gesture swiping rightward in the predetermined display area, the media device cyclically shifts the keys rightward.

Figure 2A:
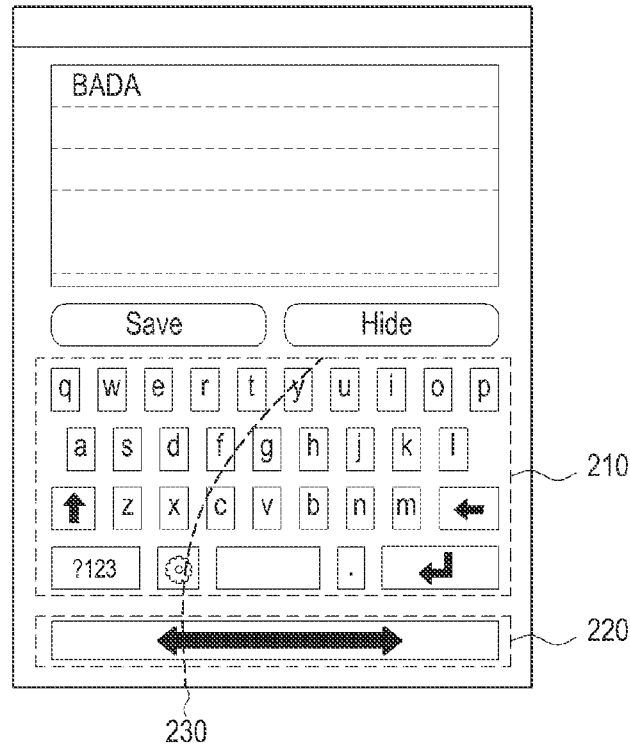
FIGS. 2A to 2D schematically illustrate a keypad displaying method according to an exemplary embodiment of the present invention.
Figure 2B:
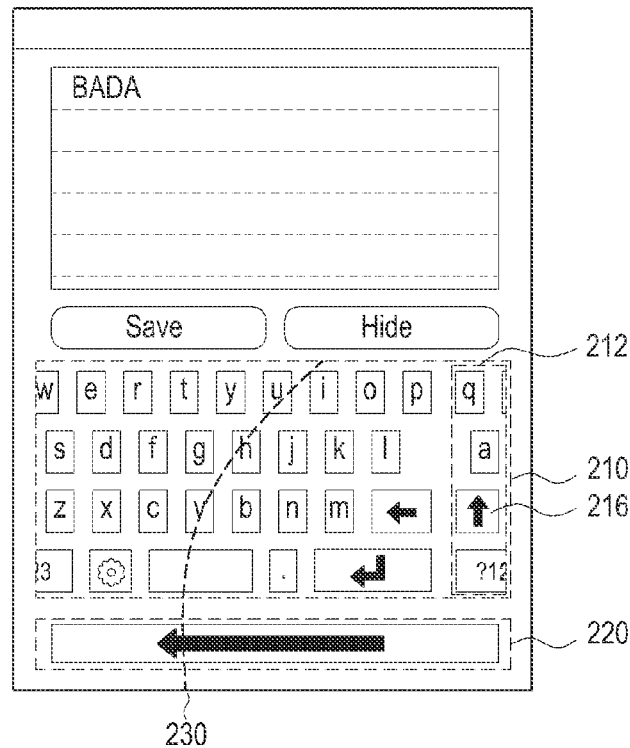
Figure 2C:
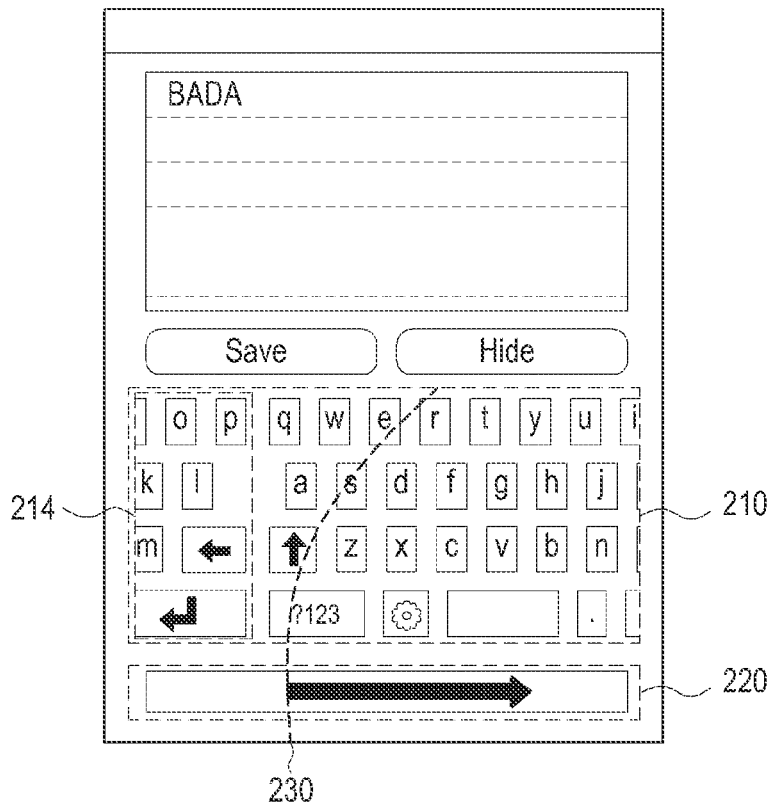
Figure 2D:
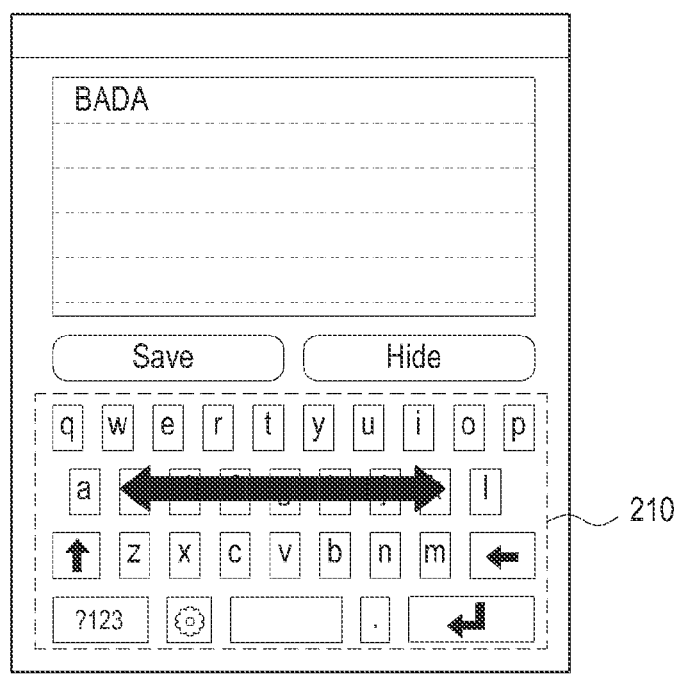

According to exemplary embodiments of the present invention, the predetermined display area in which a request for cyclic key shift is input may be, for example, the first display area 210. For example, as illustrated in FIG. 2D, the user may input a request for a cyclic key shift to the first display area 210. The request for a cyclic key shift may correspond to a user's gesture in a leftward direction or a user's gesture in a rightward direction. Upon detection of the request for a cyclic key shift, the media device operatively cycles the keypad so as to shift the keys in a corresponding direction.

According to exemplary embodiments of the present invention, the predetermined display area in which a request for cyclic key shift is input may be a second display area 220. As illustrated in FIGS. 2A to 2C, the second display area 220 may be adjacent to the first display area 210. The user may input a request for a cyclic key shift to the first display area 220. The request for a cyclic key shift may correspond to a user's gesture in a leftward direction or a user's gesture in a rightward direction. Upon detection of the request for a cyclic key shift, the media device operatively cycles the keypad so as to shift the keys in a corresponding direction.

Exemplary embodiments of the present invention described above allow the user to easily touch and select the keys that are disposed in a location not easily reached by the user's thumb.

The concept of the keypad display method according to an exemplary embodiment of the present invention has been described with reference to its relevant drawings. A keypad displaying procedure according to an exemplary embodiment of the present invention will now be described with reference to its relevant drawings.

Figure 3:
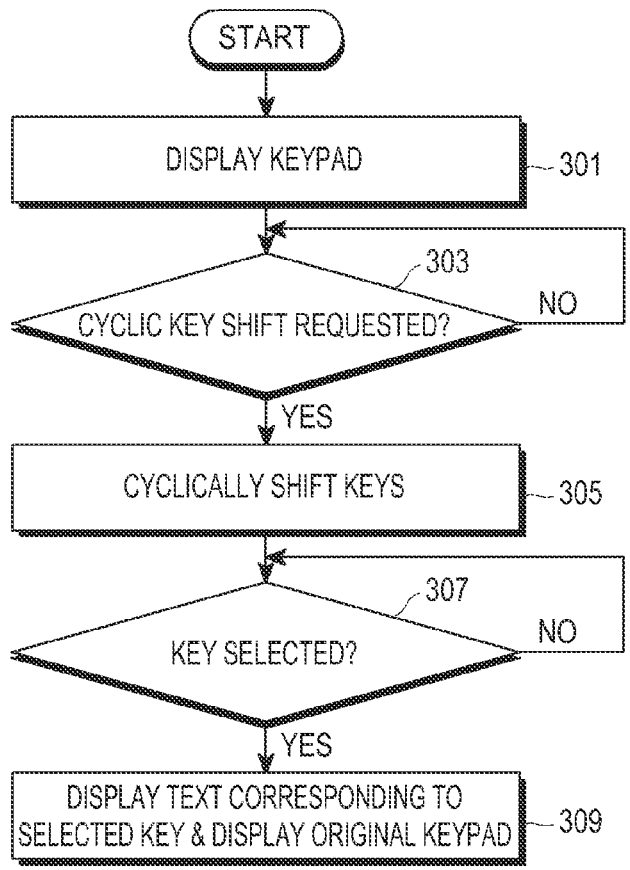
FIG. 3 is a flowchart illustrating a keypad displaying procedure according to an exemplary embodiment of the present invention.

FIG. 3 is a flowchart illustrating a keypad displaying procedure according to an exemplary embodiment of the present invention.

Referring to FIG. 3, in step 301, a media device displays the keypad including a plurality of keys in the predetermined display area. The media device then proceeds to step 303 if a certain program requiring text entry is executed.

In step 303, the media device determines whether the media device receives a request for cyclic key shift from a user. If the media device does not detect a request for a cyclic key shift, the media device may continue to poll for a request for cyclic key shift. In contrast, if the media device detects a request for cyclic key shift, the media device proceeds to step 305. As described above with reference to FIGS. 2A to 2D, the request for cyclic key shift may be generated by a user's swiping gesture taking place in the first display area 210 in which the keypad is being displayed, or in the second display area 220 which may be adjacent to the first display area 210.

In step 305, the media device cyclically shifts the keys in response to the request for cyclic key shift, and then proceeds to step 307.

To cyclically shift the keys, the media device can determine the direction and the distance, in which and by which the media device will cyclically shift the keys. For example, the media device can determine the direction in which the media device will cyclically shift the keys, on the basis of the direction in which the user's swiping gesture has occurred.

For example, upon recognizing a user's right-to-left swiping gesture while displaying the keypad as shown in FIG. 2A, the media device cyclically shifts the keys leftward as shown in FIG. 2B. As illustrated in FIG. 2B, keys 212, which were located at the left side of the screen, have moved (e.g., have been cyclically shifted) to the right side of the screen after the user's swiping gesture. Similarly, upon recognizing a user's left-to-right swiping gesture while displaying the keypad as shown in FIG. 2A, the media device cyclically shifts the keys rightward as shown in FIG. 2C. As illustrated in FIG. 2C, keys 214, which were located at the right side of the screen, have moved (e.g., have been cyclically shifted) to the left side of the screen after the user's swiping gesture.

According to exemplary embodiments of the present invention, the media device may determine the distance by which the media device will cyclically shift the keys, on the basis of the distance by which the user's swiping gesture has taken place. For example, if the distance by which the user's swiping gesture has taken place is 1 cm, the media device may cyclically shift the keys by 1 cm.

In step 307, the media device determines whether the media device receives a key selection by the user. If the media device determines that a key selection by the user has not been received, then the media device may continue to poll for a key selection by the user. If the media device determines that a key selection has been received, the procedure goes to step 309.

In step 309, the media device cyclically shifts the keys back to the original positions of the keys according to the specific keypad for the media device so as to display the original (or normal) keypad after displaying a text (including special letters), which corresponds to the selected key, in the predetermined display area. For example, if the user selects an English small letter 'a' after the keys are cyclically shifted to the left side as shown in FIG. 2B, the media device displays the English small letter 'a' in the predetermined display area and then cyclically shifts the keys to display the original keypad (e.g., to display the keypad as shown in FIG. 2A). According to exemplary embodiments of the present invention, if the media device uses a QWERTY keypad, then upon selection of a key (e.g., when the keypad is I a cyclically shifted position relative to the original QWERTY keypad configuration), the media device cyclically shifts the keys so as to display the original QWERTY keypad configuration.

In contrast, if a key selected in step 307 is a function key used to perform a predetermined function, the media device performs the function corresponding to the selected function key, however, the media device may not cyclically shift the keys to their original positions. For example, as illustrated in FIG. 2B, in the condition in which the current keypad is in an English small-letter entry mode, in order for the user to enter an English capital letter 'A', the user may be required to temporally switch the keypad to an English capital-letter entry mode by selecting a shift key 216 and thereafter select the corresponding English capital letter 'A'.

In contrast, however, if the media device displays the original keypad by cyclically shifting the keys back to the original positions of the keys according to the specific keypad for the media device after the user selects the shift key 216, the user may be required to request the cyclic key shift again to select the English capital letter 'A', because the English capital letter 'A' is placed in an area in which the user cannot easily reach using the user's thumb (e.g. on the left side of the reference line 230 in case of a right-handed user).

According to exemplary embodiments of the present invention, if the key selected in step 307 corresponds to a predetermined function key such as the shift key 216, the media device performs an operation corresponding to the selected function key, but the media device may not cyclically shift the keys to the original positions of the keys according to the specific keypad for the media device.

A keypad displaying procedure according to an exemplary embodiment of the present invention has been described with reference to its relevant drawings. A keypad displaying apparatus according to an exemplary embodiment of the present invention will now be described with reference to its relevant drawings.

Figure 4:
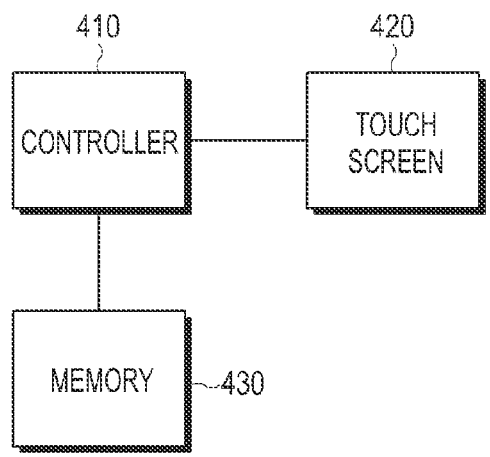
FIG. 4 is a block diagram illustrating a keypad displaying apparatus according to an exemplary embodiment of the present invention.

FIG. 4 is a block diagram illustrating a keypad displaying apparatus according to an exemplary embodiment of the present invention.

Referring to FIG. 4, the proposed keypad displaying apparatus includes a controller 410, a touch screen 420 and a memory 430.

The controller 410 controls the touch screen 420 so that a keypad including a plurality of keys may be displayed in a predefined display area thereof Upon a user's request for cyclic key shift on the touch screen 420, the controller 410 cyclically shifts the keys in response to the request while displaying the keypad. The request for cyclic key shift may be generated by a user's swiping gesture occurring in the predetermined display area of the touch screen 420. The controller 410 may cyclically shift the keys on the basis of the direction and distance, in which and by which the user's swiping gesture has taken place. If the user selects a certain key after cyclically shifting the keys, the controller 410 may display a text (e.g., including special letters), which corresponds to the selected key, in the predetermined display area of the touch screen 420, and thereafter cyclically shift the keys back to the original positions of the keys so as to display the original keypad. If a key selected by the user corresponds to a predetermined function key, the controller 410 performs an operation corresponding to the selected function key, however, the controller 410 may not cyclically shift the keys back to the original positions of the keys (e.g., on the basis of the key selection corresponding to a predetermined function key).

After cyclically shifting the keys, the controller 410 maps the positions to which the keys have moved to the positions at which signals associated with the keys are generated.

The touch screen 420, under control of the controller 410, displays a keypad in the predetermined display area on the touch screen 420, recognizes a user's swiping gesture taking place in the predetermined display area of the touch screen 420 and transfers the recognition results to the controller 410.

The memory 430 stores configuration information of the keypad.

The abovementioned exemplary embodiments of the present invention may be implemented in various ways. For instance, the exemplary embodiments of the present invention may be implemented by means of hardware, software or a suitable combination thereof When implemented by software, the exemplary embodiments of the present invention may be accomplished in the form of software executable in one or more processors that use a variety of Operating Systems (OSs) or platforms. Additionally, such software may be composed by means of any one of multiple suitable programming languages, and compiled into machine codes or intermediate codes which are executable in frameworks or virtual machines.

Furthermore, when implemented in one or more processors, the exemplary embodiments of the present invention may be implemented with non-transitory processor-readable media (e.g., memories, floppy disks, hard disks, compact disks, optical disks, magnetic tapes, and the like) storing one or more programs for performing the method of implementing the aforementioned exemplary embodiments.

As is apparent from the foregoing description, according to exemplary embodiments of the present invention, the user may be allowed to conveniently enter text into a media device while holding the device with one hand.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A keypad displaying method comprising:
    displaying a keypad, in a first arrangement, including a plurality of keys in a predetermined first display area;
    in response to receiving a request to cyclically shift the plurality of keys, displaying the keypad in a second arrangement in which the plurality of keys are cyclically shifted;
    in response to receiving a predetermined input in the keypad, displaying the keypad in the first arrangement;
    in response to selecting any one of the plurality of keys, determining whether the selected key corresponds to a function key for executing a predetermined function; and
    if the selected key corresponds to the function key, displaying the keypad in the second arrangement.

2. The keypad displaying method of claim 1, wherein the request to cyclically shift the plurality of keys is generated by a user's swiping gesture occurring in the first display area.

3. The keypad displaying method of claim 2, wherein the cyclically shifting of the plurality of keys comprises:
    cyclically shifting the plurality of keys according to a direction of the swiping gesture.

4. The keypad displaying method of claim 2, wherein the cyclically shifting of the plurality of keys comprises:
    cyclically shifting the plurality of keys according to a distance of the swiping gesture.

5. The keypad displaying method of claim 1, wherein the request to cyclically shift the plurality of keys is generated by a user's swiping gesture occurring in a second display area that is adjacent to the first display area.

6. The keypad displaying method of claim 5, wherein the cyclically shifting of the plurality of keys comprises:
    cyclically shifting the plurality of keys according to a direction of the swiping gesture.

7. The keypad displaying method of claim 5, wherein the cyclically shifting of the plurality of keys comprises:
    cyclically shifting the keys according to a distance of the swiping gesture.

8. The keypad displaying method of claim 1, wherein the first arrangement corresponds to an original position of keys on the keypad.

9. A non-transitory processor-readable recording medium storing a program for performing the method according to claim 1.

10. A keypad displaying apparatus comprising:
    a touch screen; and
    a controller configured to:
        control the touch screen to display a keypad, in a first arrangement, including a plurality of keys in a predetermined first display area of the touch screen,
        in response to receiving a request to cyclically shift the plurality of keys, display the keypad in a second arrangement in which the plurality of keys are cyclically shifted,
        in response to receiving a predetermined input in the keypad, display the keypad in the first arrangement,
        determine, in response to selecting any one of the plurality of keys, whether the selected key corresponds to a function key for executing a predetermined function, and
        if the selected key corresponds to the function key, display the keypad in the second arrangement.

11. The keypad displaying apparatus of claim 10, wherein the request to cyclically shift the plurality of keys is generated by a user's swiping gesture occurring in the first display area.

12. The keypad displaying apparatus of claim 11, wherein the controller is further configured to cyclically shift the plurality of keys according to a direction of the swiping gesture.

13. The keypad displaying apparatus of claim 11, wherein the controller is further configured to cyclically shift the plurality of keys according to a distance of the swiping gesture.

14. The keypad displaying apparatus of claim 10, wherein the request to cyclically shift the plurality of keys is generated by a user's swiping gesture occurring in a second display area of the touch screen that is adjacent to the first display area.

15. The keypad displaying apparatus of claim 14, wherein the controller is further configured to cyclically shift the plurality of keys according to a direction of the swiping gesture.

16. The keypad displaying apparatus of claim 14, wherein the controller is further configured to cyclically shift the plurality of keys according to a distance of the swiping gesture.

17. The keypad displaying apparatus of claim 10, wherein the first arrangement corresponds to an original position of keys on the keypad.

* * * * *